Nov. 6, 1928.
R. F. GRANT ET AL
1,690,446
LEACHING PROCESS
Filed March 31, 1925     2 Sheets-Sheet 1
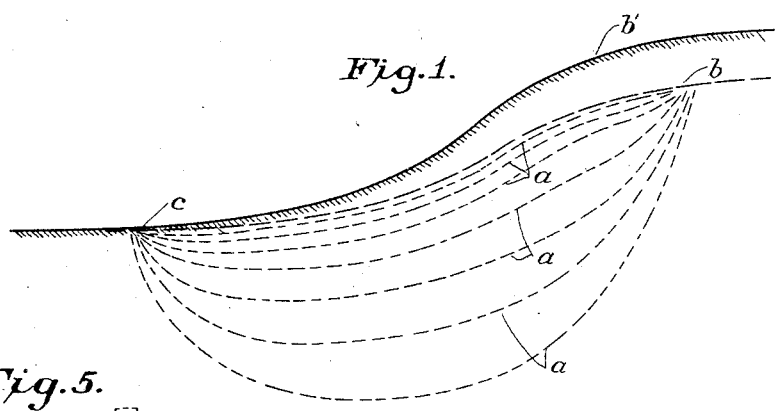
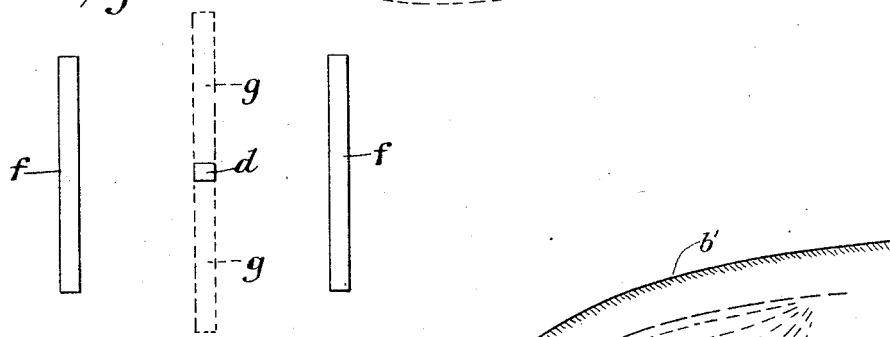
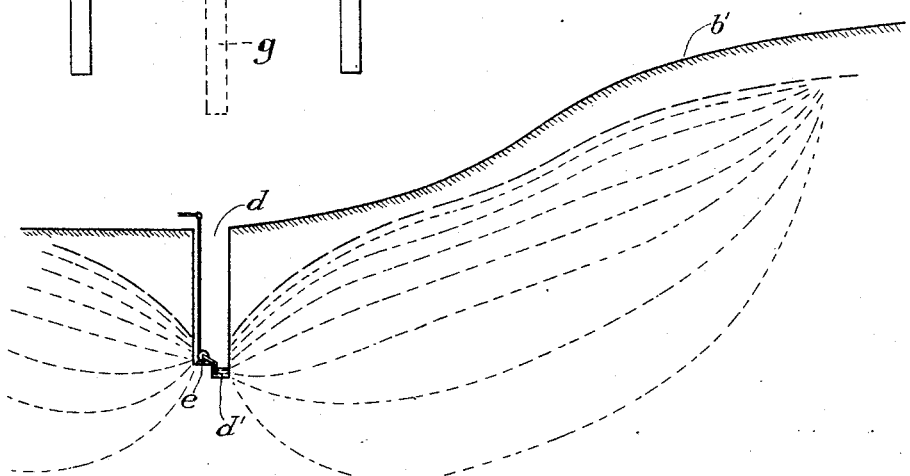
Fig. 2
Franklin B. Richards
Richard F. Grant
Herbert E. Wetherbee
INVENTORS Nov. 6, 1928.  1,690,446
R. F. GRANT ET AL
LEACHING PROCESS
Filed March 31, 1925   2 Sheets-Sheet 2

Franklin B. Richards,
Richard F. Grant
Herbert E. Wetherbee
INVENTORS

ATTORNEY

Patented Nov. 6, 1928.

1,690,446

UNITED STATES PATENT OFFICE.

RICHARD F. GRANT, FRANKLIN B. RICHARDS, AND HERBERT E. WETHERBEE, OF CLEVELAND, OHIO, ASSIGNORS OF ONE-FOURTH TO HOWARD M. HANNA, OF CLEVELAND, OHIO.

LEACHING PROCESS.

Application filed March 31, 1925. Serial No. 19,684.

Our invention relates to improvements in a chemical leaching process and more particularly to the leaching of a valuable mineral content from ore deposits in their natural and undisturbed position; the object of said invention being to obtain the mineral values at a minimum cost and without incurring the expense of usual mining operations.

Leaching processes practiced under ordinary conditions, necessitate mining and more or less minutely sub-dividing the treated ore, because of the necessity for abbreviating the treating period together with the construction of enormous tanks or containers and their equipment with suitable auxiliary apparatus.

It is quite obvious, accordingly, that if the ore values may be recovered in sufficient quantities without incurring such heavy overhead expense, very much lower grade ores may be leached successfully, or a much lower cost of production may be obtained with ores of the same characteristics. Having these requirements in view, we have devised a process for treating many mineral bearing formations in place, i. e., in their natural and undisturbed position, and with a minimum expenditure for instituting the leaching operations.

Thus, with mineral bearing formations of more or less pervious character, either due to the character of the formation itself, or to minute fissures and fractures therein, it is possible to obtain the deferred percolation of a chemically active leaching fluid and the collection of such leaching fluid with its dissolved content, either by tunneling, sinking shafts, running drifts and collecting through the natural flow, or pumping the surface water from the surrounding treated area, together with the leaching fluid and its mineral content.

Although we recognize that mineral bearing formations will present their own individual problems, we shall explain and illustrate two typical workings for leaching ore values in place, in order to set forth the principles of our invention. We may make reference to the accompanying drawings wherein, Fig. 1 is a diagrammatic view, in cross section, illustrating the principle that the level of the ground water roughly follows the topography of the terrain.

Fig. 2 is a similar diagrammatic view, illustrating the converging depressed flow of the ground water produced by sinking a shaft and pumping therefrom.

Fig. 5 is a diagrammatic plan view of the workings shown in Fig. 4.

Throughout the several figures of the drawings, we have employed the same character of reference to designate similar elements.

It is a well known physical fact that the level of the ground water roughly follows the topography of the particular terrain and that the flow of such ground water $a$, from a higher level $b$, to a lower level $c$, is not on a straight line but generally follows the paths indicated in Fig. 1. This ground water must be reckoned with in the practice of our invention as under the conditions assumed in Fig. 2, wherein a shaft $d$ is sunk to any desired level, from which the ground water is continuously pumped by pump $e$. The flow converges on the shaft or its connected workings to collect in a common sump $d'$ at the bottom of the shaft. Thus, it has been found in a typical instance, upon testing bore holes, that the level of the ground water is deflected in an area 400 feet wide by lowering the water 50 feet below the normal level of the ground water in a winze connected with undeground workings 70 feet below the normal level of said ground water.

Figure 3:
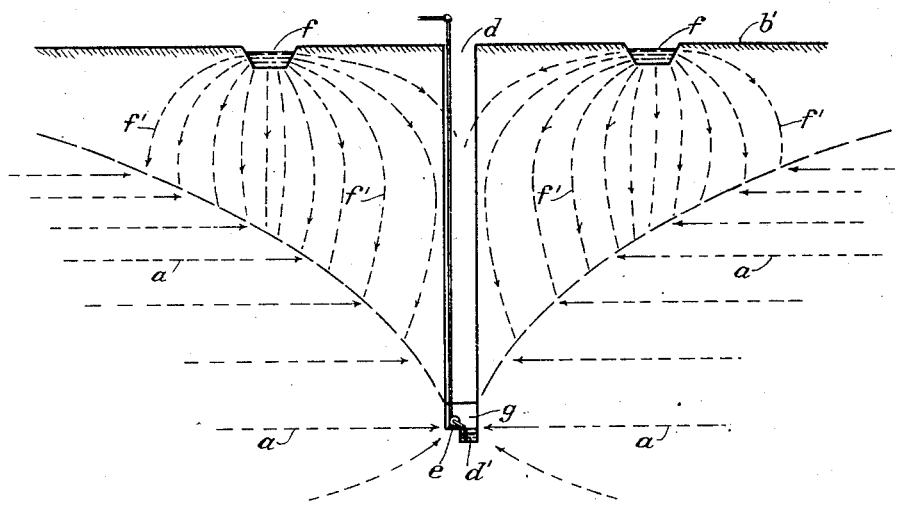
Fig. 3 is another diagrammatic view, illustrating the practice of our invention under topographic conditions resembling those shown in Fig. 2.

It, therefore, is apparent that water or chemically active solutions introduced into the trenches $f$, Fig. 3, dug at a distance from the mouth of the shaft and substantially paralleling the lower workings, indicated in Fig. 5, throughout the area affected by the displacement of the ground water, will find their way to the deflected surface of said ground water and flow into the sump as generally indicated by the lines $f'$.

The under workings, with the conditions assumed, comprise the connecting drifts $g$, so that the workings will produce a flow in the form of an enormous trough that converges at the bottom of the pump shaft $d$.

Figure 4:
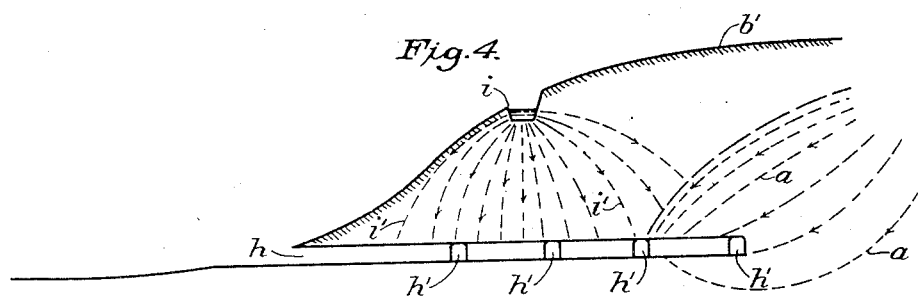
Fig. 4 is another diagrammatic view, illustrating the practice of our invention under topographic conditions, avoiding the necessity for pumping the ground water and percolating leaching fluid.
Figure 6:
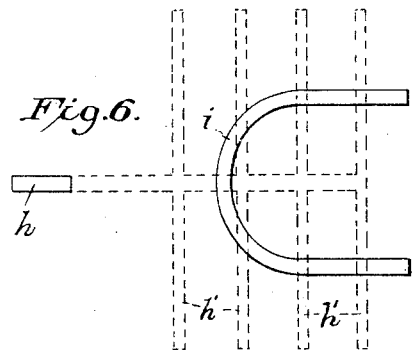
Fig. 6 is a similar view of the workings shown in Fig. 5.

The workings of Fig. 4 assume a depressed level for the ground water substantially coincident with the tunnel $h$, from which lateral drifts $h'$, are run beneath the area of seepage from the trenches $i$, containing the chemically active leaching fluid. The leaching fluid will collect and be drained off from the drifts by the tunnel $h$ for the recovery of the mineral content. Such recovery, of course, is dependent upon the character of the dissolved mineral and may be accomplished in any well known manner. The flowage of the water or chemically reactive solutions from the surface preferably is through the natural joints and cracks, but is also through the capillary passages in the ore formation where it may come in contact with mineral particles that may be disseminated throughout the rock. In the joints and cracks the flow follows the ordinary laws of hydrostatics. In the capillary passages the flow is much slower and is controlled by the viscosity of the liquid, being much greater with solutions of low viscosity than with more viscous solutions. The viscosity of solutions in general in much less at higher than at lower temperatures, therefore, conditions which naturally lend themselves to higher temperatures are very desirable.

It is our purpose, as indicated above, to obtain the natural circulation of underground water, suitably controlled for any given situation, so as to make possible the leaching of more or less homogeneous ore bearing formation without previous mining operations other than those necessary to control the flow of ground water and the leached content. The leaching preferably is attained with suitable dilute solutions that are chemically reactive, or suitable dilute acids. The importance of limiting and restricting the action of the leaching fluid to the area and volume of the ore body affected by the tunnelling is obvious, for the reason that very substantial losses of the mineral bearing fluid otherwise would occur, even to the extent of making such operations impractical or unprofitable in practice.

As a specific example of our chemical leaching process, we may instance the employment in the trenches of a dilute solution of ferric sulphate or of free acid for the purpose of dissolving the copper content in chalcocite formation. The ferric sulphate advantageously may be used in solution containing 2 to 4 per cent thereof and its percolation will dissolve the copper content of the mineral formation as a sulphate with the reduction of the ferric sulphate to ferrous sulphate. The cement copper may be recovered from the pumped surface water and leaching fluid by treating with iron scrap in the well known manner, while the ferrous sulphate may be reconverted into ferric sulphate to further a cyclic process of leaching.

However, we do not desire to confine our invention to any specific leaching fluid nor any detailed procedure other than that outlined in the appended claim. Thus, in the specific instance mentioned above by way of illustration, either dilute sulphuric acid or dilute ferric sulphate, or a solution of the latter with free acid content may be employed for leaching chalcocite, for which such dilute solutions are well adapted, but other dilute solutions obviously should be continuously supplied to mineral bearing formations of different content and characteristics within the spirit and intent of our invention.

Having now described typical procedures for practicing our invention, we claim as new, and desire to secure by Letters Patent, the following:

The herein described operations for insuring the leaching of copper values in place, which consists in driving a shaft and connecting drifts to widen operations at a level below that of the surface water, providing localized trenches or containers at the surface appurtenent to such underground workings, supplying a solution of ferric sulphate of approximately 4% dilution above the drifted area of copper ore, permitting its continued percolation in quantity through the ore body, and pumping the surface water and percolating leaching fluid from the level of the drifts.

In testimony whereof we do now affix our signatures.

RICHARD F. GRANT.
FRANKLIN B. RICHARDS.
HERBERT E. WETHERBEE.